(12) United States Patent
Frijters et al.

(10) Patent No.: US 11,878,924 B2
(45) Date of Patent: Jan. 23, 2024

(54) PROCESS AND DEVICE FOR ANAEROBIC PURIFICATION

(71) Applicant: Paques I.P. B.V., Balk (NL)

(72) Inventors: Cornelia Theresia Maria Johanna Frijters, Hoorn (NL); Sebastiaan Leonardo De Bruin, Balk (NL)

(73) Assignee: PAQUES I.P.B.V., Balk (NL)

( * ) Notice: Subject to any disclaimer, the term of this patent is extended or adjusted under 35 U.S.C. 154(b) by 254 days.

(21) Appl. No.: 17/344,433

(22) Filed: Jun. 10, 2021

(65) Prior Publication Data

US 2021/0331957 A1 Oct. 28, 2021

Related U.S. Application Data

(63) Continuation of application No. PCT/EP2019/086595, filed on Dec. 20, 2019.

(30) Foreign Application Priority Data

Dec. 21, 2018 (EP) ..................................... 18215493

(51) Int. Cl.
| | | |
|---|---|---|
| C02F 3/28 | (2023.01) | |
| C02F 1/38 | (2023.01) | |
| C02F 11/04 | (2006.01) | |
| C02F 1/24 | (2023.01) | |
| C02F 103/32 | (2006.01) | |

(52) U.S. Cl.
CPC .............. *C02F 3/2806* (2013.01); *C02F 1/38* (2013.01); *C02F 3/286* (2013.01); *C02F 3/2846* (2013.01); *C02F 11/04* (2013.01); *C02F 1/24* (2013.01); *C02F 3/2893* (2013.01); *C02F 2103/327* (2013.01); *C02F 2209/03* (2013.01); *Y02E 50/30* (2013.01)

(58) Field of Classification Search
CPC ........ C02F 3/2806; C02F 1/38; C02F 3/2846; C02F 3/286; C02F 11/04; C02F 1/24; C02F 3/2893; C02F 2103/327; C02F 2209/03; Y02E 50/30
USPC ................... 210/603, 605, 221.1, 221.2, 259
See application file for complete search history.

(56) References Cited

U.S. PATENT DOCUMENTS

| | | |
|---|---|---|
| 4,948,509 A | 8/1990 | Stack |
| 10,179,895 B2 * | 1/2019 | Kodukula ............... C12M 23/58 |
| 2012/0048801 A1 | 3/2012 | Hong et al. |

FOREIGN PATENT DOCUMENTS

| | | |
|---|---|---|
| CN | 101781059 A | 7/2010 |
| JP | 05-111699 | 5/1993 |
| KR | 20150046555 | 4/2015 |
| WO | WO-02/076893 | 10/2002 |
| WO | WO-2018/215040 A1 | 11/2018 |

(Continued)

OTHER PUBLICATIONS

International Search Report and Written Opinion for PCT/EP2019/086595 dated Jan. 24, 2020.

(Continued)

*Primary Examiner* — Fred Prince
(74) *Attorney, Agent, or Firm* — Sunit Talapatra

(57) ABSTRACT

The present invention relates to a process for the separation of biomass in the anaerobic purification of wastewater and to a system for the separation of biomass in the anaerobic purification of wastewater.

21 Claims, 2 Drawing Sheets

(56) References Cited

FOREIGN PATENT DOCUMENTS

WO    WO-2018/218909 A1    12/2018

OTHER PUBLICATIONS

Frijters et al., "Experiences with anaerobic treatment of fat-containing food waste liquids: two full scale studies with a novel anaerobic flotation reactor," Water Science & Technology, 697, 2014.

Menkveld et al., "Aecomix(tm) for efficient energy recovery from wastewater and waste streams," Water Practice and Technology vol. 13 No. 2, 2018.

* cited by examiner

PROCESS AND DEVICE FOR ANAEROBIC PURIFICATION

CROSS-REFERENCE TO RELATED APPLICATIONS

The present application is a Continuation of International Patent Application No. PCT/EP2019/086595, filed Dec. 20, 2019, which claims priority to European Patent Application No. 18215493.0 filed Dec. 21, 2018, the entire contents of all of which are hereby incorporated by reference.

FIELD OF THE INVENTION

The present invention relates to a process for the separation of biomass in the anaerobic purification of wastewater and to a system for the separation of biomass in the anaerobic purification of wastewater.

BACKGROUND ART

By-product or liquid waste streams containing suspended organic matter have heretofore been anaerobically fermented to produce a methane-containing gas and other desired products. For example, wastewater effluents from food processing plants commonly contain suspended organic matter, have high oxygen demands and are not acceptable under environmental laws and regulations for disposition in lakes or rivers. Such wastewater streams are often processed in anaerobic fermentation and/or aerobic biological conversion to remove the organic constituents and purify the waste water to an environmentally acceptable level.

In a typical anaerobic fermentation process, influent liquid containing suspended organic matter is introduced into an anaerobic fermentation reactor which excludes air or oxygen and contains anaerobic microorganisms for converting the suspended organic matter to fermentation products. Fermentation of wastewaters containing high amounts of suspended solids requires relatively long retention times. The fermentation products are comprised of a gas containing carbon dioxide and methane which is separated and utilized as an energy or heat source. The anaerobic fermentation reaction produces bacterial cell mass commonly referred to as sludge or "biomass", which form flocs, and which are retained in the reactor vessel. The effluent liquid produced is substantially free of organic matter and suspended solids. The separation and removal of gas and biomass from the reacted liquid have heretofore been accomplished by separate degasification and solids settling steps. That is, the reacted liquid containing suspended biomass is transported from the anaerobic fermentation reactor to a settling tank wherein the bacterial cell mass particles are allowed to settle to the bottom of the tank. The settled particles are withdrawn from the tank and recycled to the reactor. Gas entrained in the reacted liquid makes the suspended bacterial cell mass particles difficult to settle. Therefore, a degasifier is generally employed between the reactor vessel and the settling tank.

Alternatively, under certain conditions floatation separation is used. Such a process is known from U.S. Pat. No. 4,948,509 which describes a process comprising the steps of:

introducing said influent liquid into an anaerobic fermentation zone containing anaerobic microorganisms for converting said suspended organic matter into fermentation products including a gas containing methane and bacterial cell mass particles;

maintaining said influent liquid in said fermentation zone at a temperature, at a first pressure and for a time sufficient to form said gas and to form a liquid containing dissolved gas and suspended bacterial cell mass particles;

withdrawing said liquid containing dissolved gas and suspended bacterial cell mass particles from said fermentation zone;

introducing said liquid into a flotation zone;

maintaining said liquid in said flotation zone at a temperature, at a second pressure and for a time whereby solution gas dissolved in said liquid is liberated therein forming bubbles which rise and cause said suspended bacterial cell mass particles to be floated to the surface of said liquid;

withdrawing said bacterial cell mass particles from the surface of said liquid and from said flotation Zone;

recycling said withdrawn bacterial cell mass particles to said fermentation zone; and conducting the remaining liquid from said flotation zone to a point of further processing or use.

WO 02076893 discloses a process for the anaerobic purification of slurry which contains organic constituents. Slurry which is to be treated is fed periodically or continuously to a mixture-filled, substantially closed reactor (2), while the slurry is forcibly mixed with mixture (3) from the reactor. The mixture in the reactor is subjected to upward flow through it and to a hydrolysis process. The mixture is subjected to floatation by injection with so called whitewater (effluent with low-oxygen gas dissolved under pressure (typically 5 bar(a)), such as biogas which originates from the reactor), and the floating layer of solids which is formed in the process is returned to the mixture in the reactor, while the low-particle liquid which is formed in the process is discharged as effluent. In this set-up part of the effluent is recycled for the production of whitewater.

The known processes for anaerobic purification of organic constituent comprising wastewater have the disadvantage that in some cases a poor separation of biomass from the reactor contents is achieved resulting in inconsistent and unreliable processing.

There is a need for an anaerobic purification of organic constituent comprising wastewater that has improved biomass separation.

SUMMARY OF THE INVENTION

According to the present invention, a process is provided, in which biomass is separated from an anaerobically treated wastewater stream.

According to the present invention, there is provided a process for the separation of biomass from treated wastewater following anaerobic purification of wastewater, comprising the steps of:

a) supplying a stream of wastewater comprising organic constituents to a reactor comprising biomass, the biomass comprising anaerobic microorganism, b) mixing the wastewater and biomass, to provide biogas and a reactor contents comprising treated wastewater and biomass, c) supplying at least a part of the reactor contents and a gas, preferably biogas, to a first tank, wherein the biogas is injected under pressure into the tank contents to provide a pressurized tank contents, wherein the gas is dissolved in the tank contents, d) supplying the pressurized tank contents to a second tank, wherein the pressure in the second tank is lower than in the first tank, to provide a floating biomass layer and a treated wastewater layer, e) withdrawing the treated wastewater from the second tank and recycling the biomass layer from the second tank to the reactor of step a).

The inventors have surprisingly found that mixing the reactor contents of the anaerobic reactor with a gas under pressure prior to providing the reactor contents to a second tank where floatation separation occurs, provides an efficient biomass separation. Although the applicant does not wish to be bound by theory, it is believed that when mixtures of treated wastewater and biomass comprising a dissolved gas, are reduced in pressure, bubbles preferably form at the solid/water interface and therefore bubbles more effectively entrain biomass than simply mixing with an effluent in which an equivalent amount of is dissolved. Advantageously, in the process of the present invention a floating biomass layer consisting of flocculent biomass is formed quickly without biomass sinking to the bottom of the second tank, thus improved biomass separation is achieved.

The present invention will be discussed in more detail below, with reference to the attached drawings, in which:

FIG. 1 depicts a process of the prior art.

FIG. 2 depicts a process according to an embodiment of the present invention.

SUMMARY OF THE INVENTION

"Sludge" refers to any solid or solid-like material present in a reactor or its influent or effluent which can be separated from the liquid part of the reactor (or influent or effluent) by physical means, such as filters, cyclones, settlers, membranes and the like.

The sludge can comprise an organic part, which includes all biological material as well as non-soluble or not finely dispersible organic compounds, and an inorganic part, which includes non-soluble or not finely dispersible salts and other inorganic material.

"Biomass" refers to all biological (organic) material as well as non-soluble or not finely dispersible organic compounds, which may be solid or solid-like material present in a reactor or its influent or effluent which can be separated from the liquid part of the reactor (or influent or effluent) by physical means, such as filters, cyclones, settlers, flotation units, membranes and the like.

"Flocs" or "biomass flocs" as used herein refers to the agglomerations of biomass formed in the reactor known as flocculent biomass.

"Dry solids" comprises solid material, from which soluble inorganic materials (salts, ash) and water and other liquids have been separated or have been taken into account in calculating product levels.

"Chemical oxygen Demand" (COD) refers to organic material that can be oxidised to smaller molecules, ultimately to carbon dioxide and water, and the term expresses the amount of oxygen that would be needed to oxidise the organic material, typically in a litre of wastewater.

"Biodegradable COD" refers to organic material in wastewater that can be converted by biomass (microorganisms).

"Substrate" means organic material converted by microorganisms to allow them to grow, i.e. equivalent to Biodegradable COD.

"Readily Biodegradable Chemical Oxygen Demand (RBCOD)" refers to relatively small organic molecules that can be quickly converted by microorganisms as further illustrated below".

"Other Biodegradable Chemical Oxygen Demand (OB-COD)" refers to bio-degradable COD other than RBCOD, i.e. more complex and less accessible organic compounds, for example complex polysaccharides, fats and proteins, as well as organic compounds having relatively few oxygen-containing groups and relatively large hydrocarbon groups, such as long-chain fatty acids.

"Wastewater" refers to an aqueous stream comprising COD that needs to be treated before it can be reused or discharged to the environment. Wastewater for example includes process water, side-product or intermediate product streams from bio-based or other industries, as further illustrated below. Sludge provided to the reactor can comprise wastewater.

In the process according to the present invention, in step a) a stream of wastewater comprising organic constituents (also referred to as sludge comprising organics) is supplied to a reactor comprising biomass, the biomass largely comprising anaerobic microorganisms. The waste water may be supplied continuously, or batch-wise to the reactor, preferably continuously. Preferably, the biomass in the reactor is flocculent biomass. The mixture in the reactor, to which, therefore, sludge to be treated is fed periodically or continuously, is purified anaerobically by means of biological processes (including hydrolysis, acidification, acetogenesis and methanogenesis) in a reactor with upward and/or downward flow. Preferably the wastewater to be treated is fed to the reactor continuously. This leads to biogases being released, comprising, inter alia, $CO_2$ and $CH_4$. The fact that the reactor is substantially closed means that these biogases will collect at the top of the reactor, i.e. above the mixture located therein.

To obtain relatively clean, i.e. relatively low-particle effluent, the reactor contents is transferred to a first tank and injected with a gas at a high pressure, for example 3-6 bar(a). Preferably the gas is a low oxygen gas, preferably an oxygen-free gas. More preferably, the low oxygen gas is biogas. According to the invention, it is possible in particular for the biogas which is released during the anaerobic purification and which collects in the top of the substantially closed reactor to be used as a very appropriate low-oxygen gas of this type. The biogas is preferably generated in the reactor in step a).

The reactor contents/gas mixture is then subjected to floatation in a tank, typically with a lower pressure (typically 30 mbar (g) i.e. overpressure), for example in a floatation cell, during which process a floating layer of solids is formed, which will float on top of the fluid which is present in the tank. In addition, heavier particles (a minor amount) will be able to collect at the bottom of the tank. Preferably the pressure in the flotation tank is at a pressure of 0 to 100 mbar (g) (gauge pressure i.e. an overpressure), more preferably the tank is at a pressure of 0 to 50 mbar (g), most preferably the tank is at a pressure of 10 to 35 mbar (g).

The floating layer of solids which forms on top of the fluid in the tank is fed back to the mixture, in order to be subjected once again to an anaerobic purification process in the said mixture. Moreover, when further sludge comprising organics is supplied, these constituents will also once again be forcibly subjected to a mixing process and, in the process, will ultimately be converted into dissolved impurities which can be converted into, inter alia, methane gas by the anaerobic bioprocesses.

The process according to the invention in particular makes it eminently possible to clean contaminated sludge comprising organics by anaerobic means, i.e. the process for anaerobic purification can be carried out with mixtures which have a high COD (chemical oxygen demand) (in this context, the term high is understood as meaning a COD in the range of 1.5 g/L to 80, preferably 5 g/L to 80 g/L, preferably 25-80 g/L. With such high CODs, there are many flocs comprising bacteria which can be made to float in the process of the present invention. Compared to prior art processes, the present invention has the advantage of separating flocculent biomass, which do not easily fragment in the process according to the invention. In addition less suspended solids are observed in the treated waste water.

During step b) the wastewater and biomass are mixed to provide biogas and a reactor contents comprising treated wastewater and biomass. The sludge to be treated is mixed in the reactor, by subjecting the mixture to upward and downward flow. If appropriate, forced mixing may be carried out directly during the supply of the sludge, for example by generating the upward and/or downward flow at or with the supply of sludge. The result of this is that at least some of the undissolved constituents in the sludge can be made to dissolve in at least the mixture which is present in the reactor.

Preferably, the mixing in step b) is carried out by addition of biogas generated in step b), by mechanical means, by injecting treated wastewater from step e) or by pumping means for circulating the reactor contents.

During step c) at least part of the reactor contents is provided to a first tank, wherein the gas is injected under pressure to provide a pressurized reactor contents. The first tank may be a vessel such as pressure reactor or a conduit through which the reactor contents is provided to the second tank and the biogas is injected into the conduit. The first tank is not a floatation tank.

Preferably, the biogas in step c) is injected at a pressure of at least 1.5 bar(a), preferably at least 2 bar (a), even more preferably at least 3 bar(a).

The gas in step c) is preferably injected in such a way that the gas supplied is dissolved at the pressure set. The skilled person knows that that according to Henry's law, the mass of a gas dissolved in a given mass of solvent, at a given temperature is directly proportional to the pressure of the gas above the solvent.

In step d) the pressurized reactor contents is supplied to a second tank, wherein the pressure in the second tank is lower (e.g. 30 mbar(g) overpressure) than in the first tank, to provide a floating biomass layer with concomitant release of gas and a treated wastewater layer. The second tank may be termed a floatation tank or floatation cell. The second tank can be positioned in or outside the reactor, preferably outside. In another embodiment, the second tank is inside the reactor (FIG. 2. schematically covers both embodiments the reactor). In the latter case with its upper rim at a height which is greater than or equal to the level of the mixture located in the reactor. This prevents mixture from being able to flow out of the reactor via the upper rim into the floatation cell. If the upper rim is at a higher level than the level of the mixture located in the reactor, this is even ruled out altogether. The floating layer can in turn relatively easily be pushed over the upper rim back into the mixture in the reactor.

During step d) the treated wastewater is withdrawn from the second tank and recycling the biomass layer from the second tank to the reactor of step a). The treated wastewater may be withdrawn from the second tank continuously, or batch-wise. In some preferred embodiments, the waste water is supplied in step a) continuously, and the treated waste water in step d) is withdrawn in batch-wise.

Preferably, the wastewater has a chemical oxygen demand (COD) of 1.5 to 80 g/L.

Preferably, the treated wastewater has a chemical oxygen demand (COD), preferably at most 1000 mg/L, more preferably at most 500 mg/L.

The pressure in the first tank is preferably in the range of 1.5 to 8 bar(a), more preferably in the range of 2-7 bar(a), most preferably 3 to 6 bar(a).

Preferably, the pressure in the headspace of the second tank is 30 mbar(g). The headspace refers to the area of the second tank between the fluid level and the top of the tank, the top being delimited by the rim of the tank.

The hydraulic retention time is preferably in the range of 0.5 to 10 days and the biomass (sludge) retention time is preferably at least 20 days, more preferably at least 30 days.

In a second aspect the present invention relates to a system for the separation of biomass comprising:
- a reactor (22) comprising a influent inlet (21), a biogas outlet (23), wherein during operation the reactor (22) is in communication with a first tank (26) via supply line (24),
- the first tank (26) comprising an inlet for receiving reactor contents from reactor (22) and either an inlet for receiving biogas (25) from reactor (22) and/or a gas (27), wherein first tank (26) is not a floatation tank and comprises pressure controlling means for controlling the pressure in the first tank (26), wherein during operation, the first tank (26) is in communication with a second tank (28) via supply line (29),
- the second tank comprises an inlet (29) for providing pressurised reactor contents, an outlet (30) for withdrawing treated wastewater, a biomass outlet (31) in communication with reactor (22) for supplying biomass to the reactor, preferably a biogas outlet (32) and preferably an outlet for settled solids (33). Preferably, settled solids can be recirculated via line (34) or (31) in communication with reactor (22).

Preferably, the reactor (22) comprises means for mixing the reactor contents, the mixing means being an injector for biogas, mechanical mixing means or a pump for circulating the reactor contents. Alternatively, the mixing means may comprise injection means for injected treated waste water.

In the second tank a scraper may be used to push the floatation layer just over the rim, if applied in a continuous mode. Alternatively another device can be used or the layer can be transported hydraulically. In the latter case an extra recirculation flow (not shown) from the effluent can be recirculated and sprayed very near to the rim edged of tank where water overflows. Via such means, scraping or spraying, the rim is kept clean from solids becoming attached and causing an irregularly overflow over the rim.

In some embodiments, the system is operated in batch mode whereby the biomass from the reactor may be discontinuously by opening and closing of a discharge valve to the first tank. In another embodiment, the system is operated in batch mode whereby the biomass from the second tank may be discontinuously removed from the second tank by opening and closing of a discharge valve.

Preferably, the reactor is a substantially closed reactor. Suitable anaerobic reactors are known the person skilled in the art.

The first tank can be a vessel, conduit or other such vessel for mixing the gas with reactor contents.

The second tank may be preferably a closed tank or an open tank. When the second tank is placed inside the reactor, the tank is preferably open at the top and is delimited by a peripheral rim, preferably wherein the second tank comprises distributing means, such that, during use, the distributing mean causes the biomass to enter biomass supply line. The second tank comprises a biogas outlet which can be connected to the gas distribution system, for example the biogas outlet can be connected to the reactor headspace.

Preferably, the biomass supply line ends in injection means for providing the pressurized reactor contents.

Figure 1:
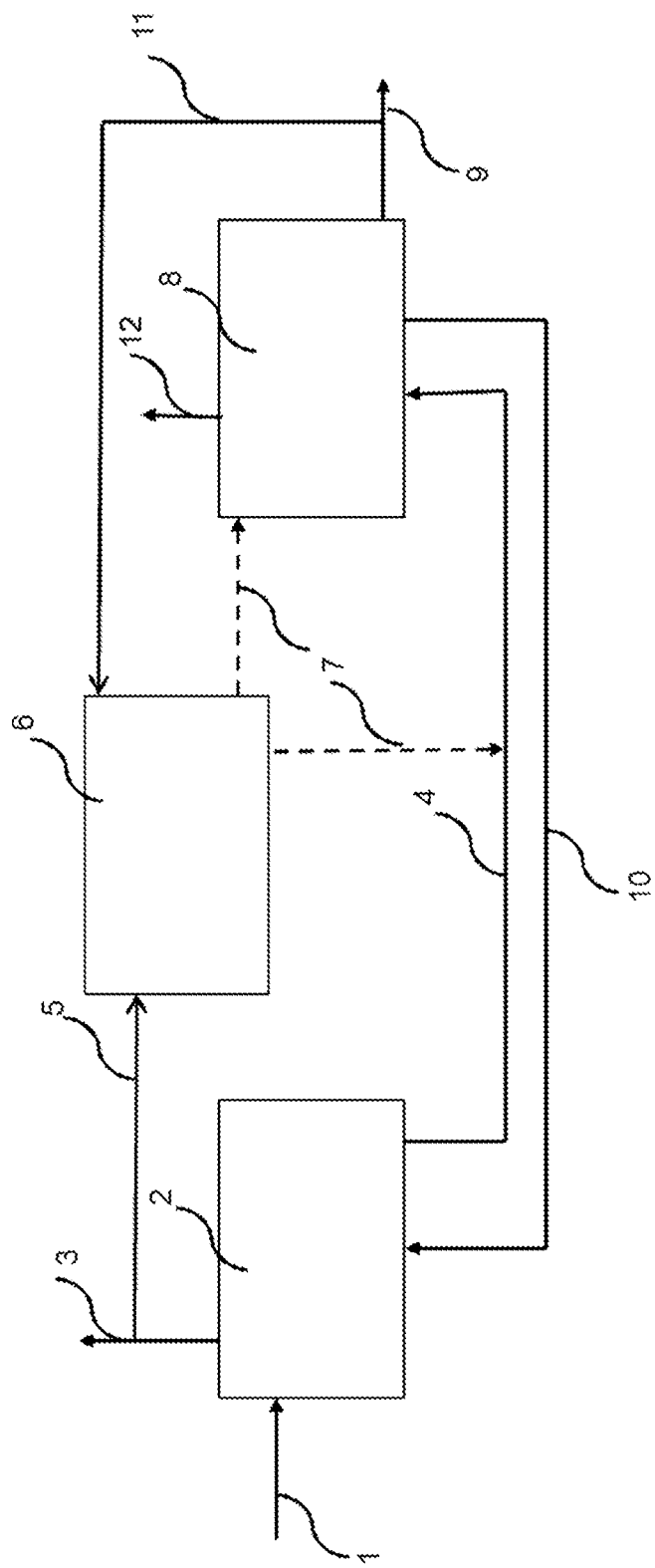
FIG. 1 schematically depicts a system according to the prior art. A reactor (2) is provided with an influent inlet for providing wastewater (1) comprising organic constituents. The wastewater can be provided continuously or batch-wise. The reactor can be provided with sensors for, temperature, pH etc. The reactor is provided with a biogas outlet (3) through which methane (biogas) generated during the anaerobic treatment can be removed.

The reactor has a supply (effluent) line (4) via which line the reactor contents of reactor (2) is provided to the first tank (6).

The first tank (6) is provided with an inlet for receiving effluent (11) and an inlet for receiving biogas from reactor (2). The first tank (6) comprises pressure controlling means for controlling the pressure in the first tank (6). The first tank (6) is in communication with a second tank (8) via supply line (7).

The second tank is provided with a supply line (7) with dissolved gas, a supply line 4 from the reactor (2) and an effluent line (9) for withdrawing treated wastewater. During operation, the pressure is released from the liquid supplied by line (7), gas bubbles will be initiated forming small bubbles. The supply 7 can be injected in the second tank (8) or in the supply 7 at a point very near to the entrance of line 4 to the second tank (8). The bubbles attach to the biomass flocks and the biomass will rise. The flocks are lifted in this way to the top of the reactor contents in the second tank (8). A floatation layer is formed on the top of second tank. The treated wastewater (effluent—9) is pumped from below the floatation layer (can be from the bottom or higher). The flotation layer travels over the rim or is pumped back to the reactor vessel (2). In the second tank a scraper may be used to push the floatation layer just over the rim. Alternatively another device can be used or an extra recirculation flow (not shown) from the effluent can be recirculated and sprayed very near to the rim. Via such means, scraping or spraying the rim is kept clean from solids becoming attached and causing an irregularly overflow over the rim (continuously or discontinuously). In a discontinuous mode of withdrawal, water can be pumped as effluent (9) and the rest of the content of the unit (8) can be pumped back to the reactor (2). The second tank is provided with a biogas outlet (12), which may be connected to the gas line 5 or directly to the reactor headspace.

Figure 2:
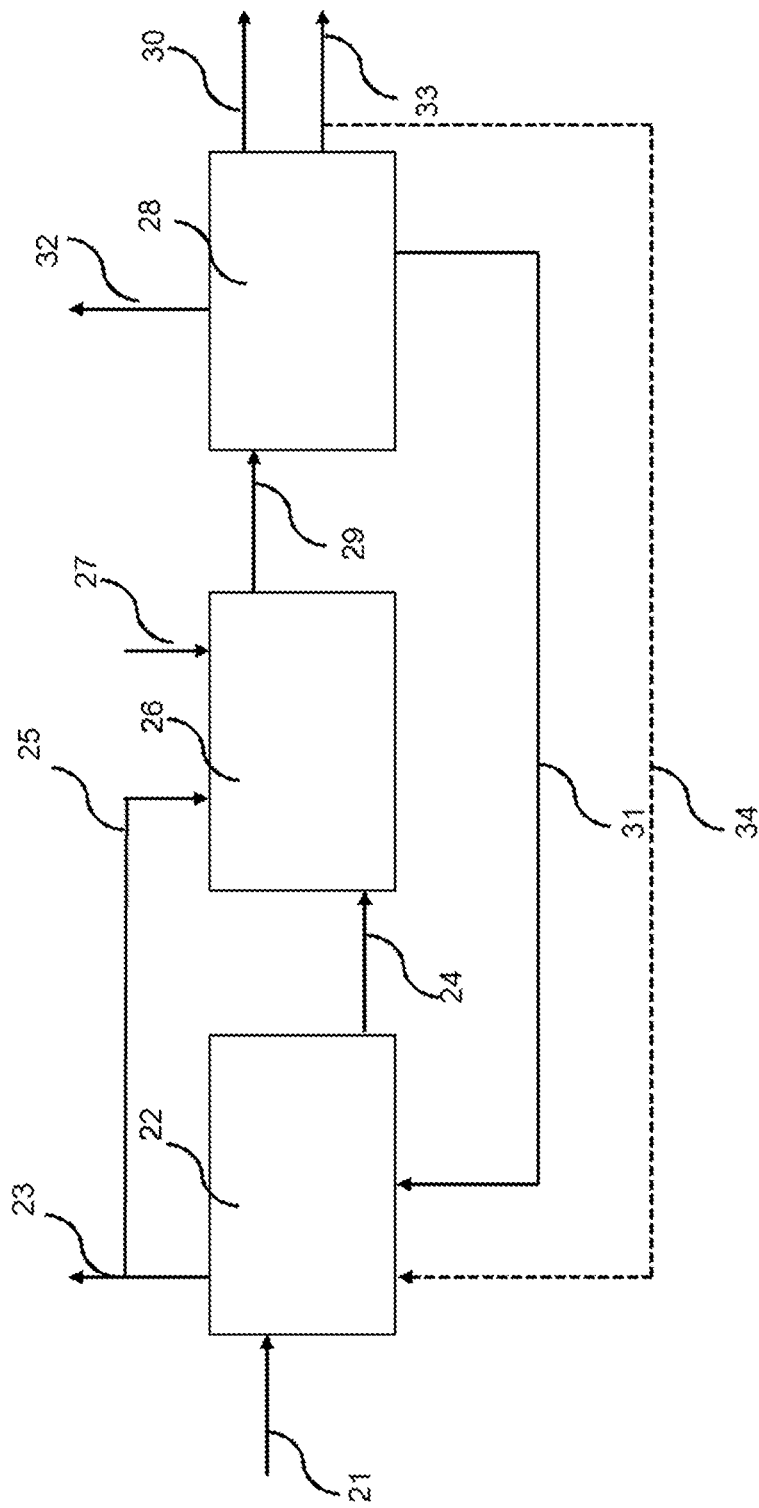

FIG. 2 schematically depicts a system according to an embodiment of the present invention. A reactor (22) is provided with an influent inlet (21) for providing wastewater comprising organic constituents. The wastewater can be provided continuously or batch-wise. The reactor can be provided with sensors temperature, pH etc. The reactor is provided with a biogas outlet (23) through which methane (biogas) generated during the anaerobic treatment can be removed.

The first tank (26) is provided with an inlet for receiving reactor contents (24) and either an inlet for receiving biogas from reactor (25) and/or a gas (27). The first tank (26) comprises pressure controlling means for controlling the pressure in the first tank (26). The first tank (26) is in communication with a second tank (28) via supply line (29).

The second tank is provided with an effluent line (30) for withdrawing treated wastewater. During operation, the pressure is released from the reactor contents, gas escapes forming small bubbles that attach to the biomass flocs and will rise. Part of the gas bubbles will be initiated and will grow in diameter on the non-dissolved flocs. The flocs are lifted in this way to the top of the second tank (28). The treated wastewater (effluent 30) is pumped or leaves the tank from below the floatation layer (can be from the bottom or higher). The water can leave the tank by means of a valve which can be controlled. The flotation layer travels over the rim and is pumped back to the reactor vessel (22) e.g. via line 31. Preferably, when the tank (28) is integrated in the reactor (22) the flotation layer falls into the reactor liquid and is mixed. In another embodiment, preferably the second tank (28) is fed discontinuously, the effluent is withdrawn and the rest of the content containing the floatation layer is pumped back to reactor (22) (or released if integrated in the reactor (22) to the reactor liquid). The second tank may also be provided with a biogas outlet (32) preferably connected to a gas line, for example for supplying gas to the reactor headspace. In addition the second tank may be provided with a settled solids outlet (33) for removing any suspended solids that settle in the tank. Preferably, settled solids can be recirculated via line (34) or line (31) in communication with reactor (22).

The present invention will now be exemplified by the following non-limiting examples.

Two processes to separate biomass from treated wastewater have been compared. Example A is a comparative example and Example 1 is according to the invention.

Comparative Example A

Ice cream wastewater (30× diluted ice cream) was treated in an anaerobic pilot reactor of 160 l. 250 ml of liquid containing 12.5 g/l of solids-COD derived from the anaerobic pilot reactor running for 1 month were transferred to a beaker. Solids-free effluent from an effluent line of a flotation tank integrated in the reactor was transferred to a vessel. Biogas was injected into the vessel until a pressure of 4 bar(g) was reached. After shaking the vessel, the biogas was largely dissolved. 250 ml of the vessel content was released through a nozzle into the liquid (containing solids) of the beaker (2). The released content can be indicated as the so-called whitewater. In more general terms, "whitewater" is the effluent in which bubbles are released by a pressure drop after being saturated with biogas (in this case with 75% methane, 25% carbon dioxide) at a higher pressure than the release pressure. The formation of a flotation layer in the beaker after addition of this whitewater was monitored for 30 min.

Example 1

Ice cream wastewater (composition similar to diluted ice cream) was treated in an anaerobic pilot reactor of 160 l. Liquid containing 12.5 g/l of solids-COD derived from the pilot reactor was provided to a steel vessel and saturated with biogas at 4 bar(g). 500 ml of the saturated liquid obtained in step (2) were released through a nozzle into the beaker. In this test no white water was added. The formation of a flotation layer in the system of the beaker was monitored for 30 min The final thickening of the solids was calculated as follows:

$$\text{Thickening factor} = \frac{\text{volume of flotation layer}}{\text{volume of reactor liquid}}$$

Concentration in flotation layer=Factor of thickening× initial concentration of solids (COD)

| Parameters | A | 1 |
|---|---|---|
| Final thickening factor | 1.88 | 2.14 |
| Solids-COD in the flotation layer | 23.5 g/l | 26.7 g/l |
| VSS in the floating layer | 18.8 g/l | 21.4 g/l |
| Time for reaching 50% of thickening | 2.5 min | <25 sec |
| Time for reaching 75% of thickening | 9.0 min | 3.6 min |
| Max. thickening achieved after 30 min | 1.88 | 2.15 |
| Sinking layer | 10 ml | Not observed |
| Aspect of flotation layer | Easily broke upon stirring | Compact, did not break upon stirring |

Example 2 and Comparative Example B

A floatation unit was placed as a pilot next to an existing anaerobic bioreactor. In comparative example B, a process according to the prior art was a carried out (cf. FIG. 1) and in Example 2 a process according to the present invention was carried out (cf. FIG. 2) and the process was operated in continual mode.

In comparative example B, the flotation unit (second tank in the figure) was supplied with 15 m³/h of reactor contents and 15 m³/h of effluent of the second tank was supplied to the high pressure vessel (first tank) injected with biogas and the supplied to the second tank, just before entering the flotation tank (second tank) the pressure was dropped to the pressure in the second tank (headspace 30 mbar).

In Example 2 the flotation unit (second tank in the figure) was supplied with 15 m³/h of effluent of the first tank (a high pressure vessel which was injected with biogas) and supplied to the second tank, just before entering the flotation tank (second tank) the pressure was dropped to the pressure in the second tank (headspace 30 mbar);

In both cases the amount supplied and quality of the biogas towards the high pressure tank (first tank) were equal (30% of $CO_2$ and 70% of methane). The parameters and results are given in the table below:

| | Comparative example B | Example 2 |
|---|---|---|
| Flow reactor water to flotation unit m³/h | 15 | — |
| Flow high pressure vessel to flotation unit m³/h | 15 | 15 |
| Final effluent flow m³/h | 9 | 9 |
| Sludge recycle flow m³/h | 6 | 6 |

-continued

| | Comparative example B | Example 2 |
|---|---|---|
| Solids-COD reactor water g/l | 8.5 | 9.3 |
| Solids-COD in sludge recycle g/l | 19.1 | 21.3 |
| Solids-COD in final effluent g/l | 1.172 | 0.836 |
| Solids layer in final effluent ml/l | 80 | 0 |
| Visual colour effluent | Very turbid, dark brown | Much less turbid, light brown |

The invention claimed is:

1. A process for the separation of biomass from treated wastewater following anaerobic purification of wastewater, the process comprising:
   (i) supplying a stream of wastewater comprising organic constituents to a reactor comprising biomass having anaerobic microorganisms;
   (ii) mixing the wastewater and biomass to provide biogas and reactor contents comprising treated wastewater and biomass,
   (iii) supplying at least a part of the reactor contents and a gas to a first tank, wherein the gas is injected at a pressure of at least 1.5 bar(a) to the first tank to pressurize the tank contents, and wherein the gas is dissolved in the tank contents,
   (iv) supplying the pressurized tank contents to a second tank, wherein the pressure in the second tank is lower than in the first tank, to provide a floating biomass layer and a treated wastewater layer,
   (v) withdrawing the treated wastewater from the second tank and recycling the biomass layer from the second tank to the reactor of (i).

2. The process according to claim 1, wherein the gas that is supplied to the first tank is biogas.

3. The process according to claim 1, wherein the wastewater has a chemical oxygen demand (COD) in the range of 1.5 to 80 g/L.

4. The process according to claim 1, wherein the biomass is flocculent biomass.

5. The process according to claim 1, wherein the treated wastewater has a chemical oxygen demand (COD) of at most 10,000 mg/L.

6. The process according to claim 5, wherein the treated wastewater has a chemical oxygen demand (COD) of at most 1,000 mg/L.

7. The process according to claim 1, wherein the mixing in (ii) is carried out by addition of biogas generated in (ii), by mechanical means, by injecting treated wastewater from (v), or by pumping means for circulating the reactor contents.

8. The process according to claim 1, wherein the gas in (iii) is injected at a pressure of at least 2 bar(a).

9. The process according to claim 1, wherein the pressure in the first tank is in the range of 1.5 to 8 bar(a).

10. The process according to claim 1, wherein the hydraulic retention time is in the range of 0.5 to 10 days.

11. The process according to claim 10, wherein the biomass sludge retention time is at least 20 days.

12. A system for the separation of biomass, comprising:
   (i) a reactor comprising a influent inlet and a biogas outlet,
   (ii) a first tank comprising:
       (a) an inlet for receiving reactor contents from the reactor, (b) an inlet for receiving biogas from the reactor and/or a gas, and
(c) a pressure controller for controlling the pressure in the first tank,
wherein the first tank is not a floatation tank, and wherein during operation the first tank is in communication with the reactor via a supply line,
(iii) a second tank comprising:
(a) an inlet for providing pressurised reactor contents,
(b) an outlet for withdrawing treated wastewater, and
(c) a biomass outlet in communication with the reactor for supplying biomass to the reactor,
wherein during operation the second tank is in communication with the first tank via a supply line.

13. The system according to claim 12, wherein the second tank comprises a biogas outlet.

14. The system according to claim 12, wherein the second tank comprises an outlet for settled solids.

15. The system according to claim 12, wherein the first tank and second tank are arranged within or outside the reactor.

16. The system according to claim 12, wherein the first tank and the second tank are arranged within the reactor.

17. The system according to claim 12, wherein the reactor comprises a mixer for mixing the reactor contents, the mixer being an injector for biogas, a mechanical mixer or a pump for circulating the reactor contents, or comprises an injector for injecting treated wastewater from the second tank.

18. The system according to claim 12, wherein the reactor is a closed reactor.

19. The system according to claim 12, wherein the second tank is open at the top and is delimited by a peripheral rim.

20. The system according to claim 12, wherein the second tank comprises a distributor for causing the biomass to enter biomass supply line during operation.

21. The system according to claim 12, wherein the supply line ends with an injector.

* * * * *